US010697317B2

(12) United States Patent
Bailey et al.

(10) Patent No.: US 10,697,317 B2
(45) Date of Patent: Jun. 30, 2020

(54) OPTICAL IMAGING SYSTEM FOR A GAS TURBINE ENGINE

(71) Applicant: General Electric Company, Schenectady, NY (US)

(72) Inventors: Jeremy Clyde Bailey, Liberty Township, OH (US); Nirm Velumylum Nirmalan, Liberty Township, OH (US); Mohamed Sakami, West Chester, OH (US); Christopher Dale Mathias, Cincinnati, OH (US); Guanghua Wang, Clifton Park, NY (US); Ronald W. Ferree, Jr., Williamsburg, OH (US)

(73) Assignee: General Electric Company, Schenectady, NY (US)

( * ) Notice: Subject to any disclaimer, the term of this patent is extended or adjusted under 35 U.S.C. 154(b) by 1102 days.

(21) Appl. No.: 15/072,647

(22) Filed: Mar. 17, 2016

(65) Prior Publication Data

US 2017/0268376 A1    Sep. 21, 2017

(51) Int. Cl.
| | |
|---|---|
| *F01D 21/00* | (2006.01) |
| *G02B 23/24* | (2006.01) |
| *G01J 3/02* | (2006.01) |
| *F01D 5/10* | (2006.01) |
| *F01D 25/04* | (2006.01) |
| *F01D 5/12* | (2006.01) |
| *F01D 25/24* | (2006.01) |
| *G01J 5/00* | (2006.01) |
| *G01J 5/02* | (2006.01) |

(52) U.S. Cl.
CPC .............. *F01D 21/003* (2013.01); *F01D 5/10* (2013.01); *F01D 5/12* (2013.01); *F01D 25/04* (2013.01); *F01D 25/24* (2013.01); *G01J 3/0291* (2013.01); *G01J 5/0088* (2013.01); *G01J 5/0205* (2013.01); *G02B 23/2476* (2013.01); *F05D 2220/30* (2013.01); *F05D 2220/32* (2013.01); *F05D 2260/96* (2013.01); *F05D 2270/8041* (2013.01); *G01J 2005/0077* (2013.01)

(58) Field of Classification Search
CPC .............................. G01J 5/0088; G01J 5/0205
See application file for complete search history.

(56) References Cited

U.S. PATENT DOCUMENTS

| | | | |
|---|---|---|---|
| 4,648,711 | A | 3/1987 | Zachary |
| 4,666,297 | A | 5/1987 | Suarez-Gonzalez |
| 5,115,636 | A | 5/1992 | Zeiser |
| 5,185,996 | A | 2/1993 | Smith et al. |
| 5,575,754 | A | 11/1996 | Konomura |
| 6,796,709 | B2 | 9/2004 | Choi |
| 7,633,066 | B2 | 12/2009 | Antel, Jr. et al. |
| RE43,928 | E | 1/2013 | Clouse et al. |

(Continued)

OTHER PUBLICATIONS

Extended European Search Report and Opinion issued in connection with corresponding EP Application No. 17161233.6 dated Jul. 31, 2017.

*Primary Examiner* — Hugh Maupin
(74) *Attorney, Agent, or Firm* — McGarry Bair PC (57) ABSTRACT

A gas turbine engine having an optical imaging system with a housing configured for mounting to a wall of the turbine engine, a hollow probe extending from the housing and having a longitudinal axis, and an image receiving device at an end of the hollow probe configured to receive at least one of a perspective or image.

24 Claims, 5 Drawing Sheets

(56) References Cited

U.S. PATENT DOCUMENTS

| | | |
|---|---|---|
| 8,431,917 B2 | 4/2013 | Wang et al. |
| 8,570,505 B2 | 10/2013 | Baleine et al. |
| 8,727,706 B2 | 5/2014 | DeLancey et al. |
| 8,790,006 B2 | 7/2014 | Li et al. |
| 9,046,411 B2 | 6/2015 | Wang et al. |
| 2004/0179575 A1* | 9/2004 | Markham ............ G01J 5/0022 374/121 |
| 2007/0107504 A1 | 5/2007 | Smed et al. |
| 2009/0202340 A1 | 8/2009 | Ballard, Jr. |
| 2012/0153157 A1 | 6/2012 | Estevadeordal et al. |
| 2012/0170611 A1 | 7/2012 | Wang et al. |
| 2014/0202130 A1 | 7/2014 | Estevadeordal et al. |
| 2014/0373609 A1 | 12/2014 | Hwang et al. |
| 2014/0376588 A1 | 12/2014 | Wang et al. |
| 2014/0376589 A1 | 12/2014 | Karp et al. |
| 2014/0376590 A1 | 12/2014 | Hwang et al. |
| 2015/0047166 A1 | 2/2015 | Lemieux et al. |
| 2015/0300920 A1* | 10/2015 | DeAscanis ............ G01M 15/14 356/614 |

\* cited by examiner

OPTICAL IMAGING SYSTEM FOR A GAS TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency. Temperatures in the high pressure turbine are around 1000° C. to 2000° C. and fluid from the compressor is around 500° C. to 760° C. Internal components of gas and steam turbines, for example, steam turbine blades are typically visually inspected, during a turbine outage, by inserting a borescope through an opening in the outer turbine shell and articulating the video head of the borescope to achieve the desired inspection view. Typically a waiting period is necessary after shutdown and before inspection because current borescope inspection equipment has a temperature limit of approximately 50° C. As a result of this temperature limitation, gas and steam turbine inspections cannot be performed until the turbine cools down from its normal operating temperature.

BRIEF DESCRIPTION OF THE INVENTION

In one aspect, an optical imaging system includes a housing configured for mounting to a wall of a turbine engine, a hollow probe extending from the housing and having a longitudinal axis, an image receiving device at an end of the hollow probe, a guide tube having a first end and a second end and defining an interior receiving at least a portion of the hollow probe wherein at least one of the first end or the second end include curved portions, and a set of springs forcing the guide tube towards the second end while allowing for axial and rocking movement of the guide tube.

In another aspect, a gas turbine engine includes a radial wall defining an interior and an exterior of the gas turbine engine and having an aperture, a set of turbine blades located in the interior and configured to rotate about a shaft, and an optical imaging system. The optical imaging system includes a housing configured for mounting to the radial wall, a hollow probe extending from the housing and having a longitudinal axis, an image receiving device at an end of the hollow probe where the image receiving device is located adjacent a hot gas path within the interior, and a guide tube having a first end and a second end and defining an interior receiving at least a portion of the hollow probe wherein at least one of the first end or the second end include curved portions configured to allow for a rocking movement of the guide tube at the curved portions.

In yet another aspect, a guide tube assembly includes a hollow guide tube having a first end, a second end configured to be housed adjacent a portion of a gas turbine, and an interior surface defining an interior and wherein at least a portion of the second end includes a curved surface allowing it to rock against the portion of the gas turbine.

DESCRIPTION OF EMBODIMENTS OF THE INVENTION

The various aspects described herein relate to an optical imaging system such as a borescope assembly and method for inspecting internal components of a turbine engine while the turbine engine is being operated. Installing optics to monitor and image hot gas path components such as airfoils and combustors, in an operating gas turbine is not a relatively easy or straight-forward task. Presently, rigid optics transmit light with higher imaging fidelity than fiber optics and thus rigid optics can be located inside a gas turbine to relay images to a convenient location where an imaging device such as an infrared (IR) camera can be placed. However, to image its interior with a fixed optics probe, an engine has to be shut down. The various aspects described herein relate to an optical imaging system that is operable while a gas turbine is operating.

For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
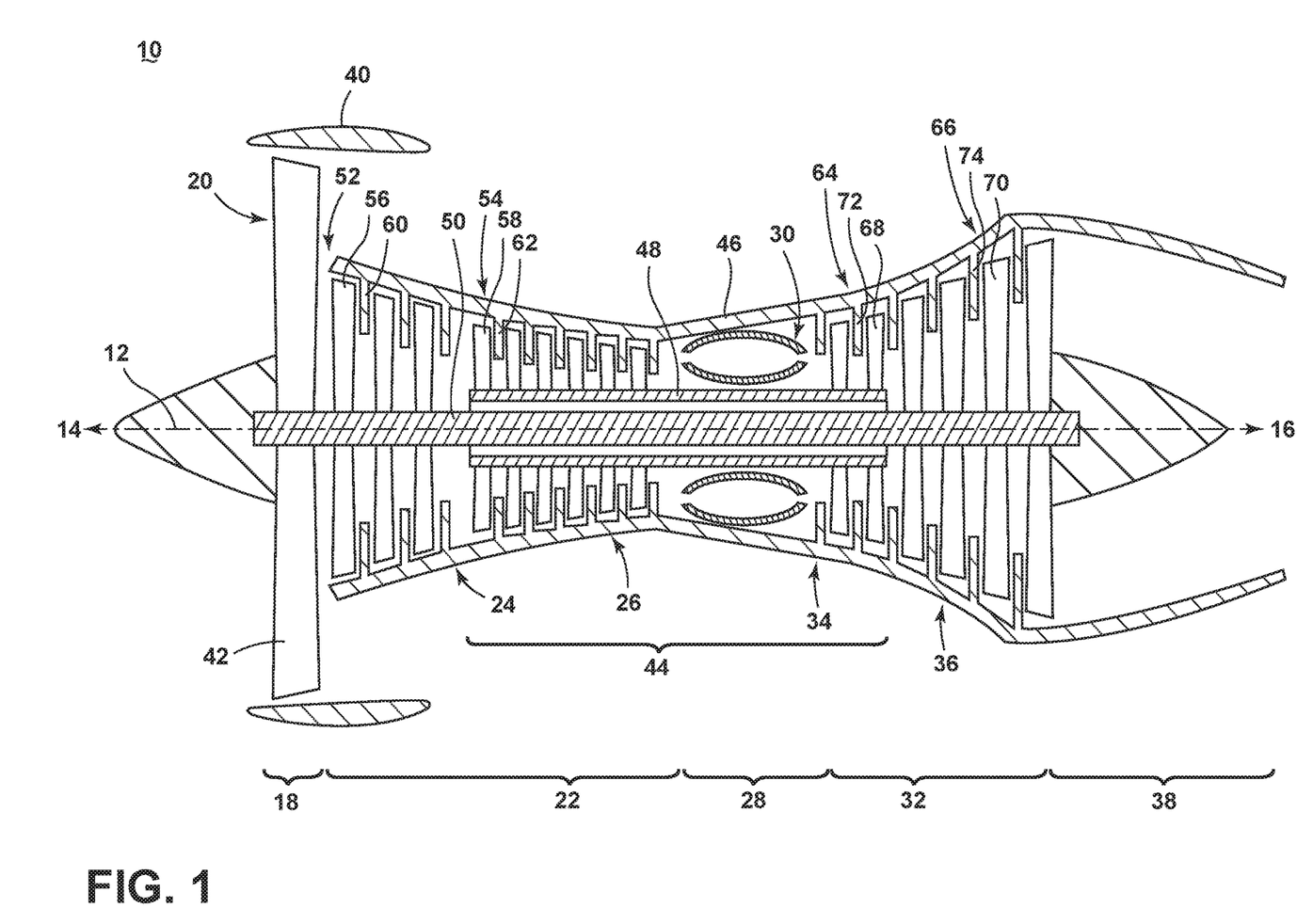
FIG. 1 is a schematic cross-sectional diagram of a gas turbine engine for an aircraft.

FIG. 1 is a schematic cross-sectional diagram of a conventional gas turbine engine 10 for an aircraft in which an optical imaging system described herein can operate. The gas turbine engine 10 has a generally longitudinally extending axis or centerline 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34 and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the gas turbine engine 10, which generates combustion gases. The core 44 is surrounded by core casing 46 which can be coupled with the fan casing 40.

A HP shaft or spool 48 disposed coaxially about the centerline 12 of the gas turbine engine 10 drivingly connects the HP turbine 34 to the HP compressor 26. A LP shaft or spool 50, which is disposed coaxially about the centerline 12 of the gas turbine engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can include, but are not limited to, fluid discharged from the LP compressor 24 or the HP compressor 26.

Figure 2:
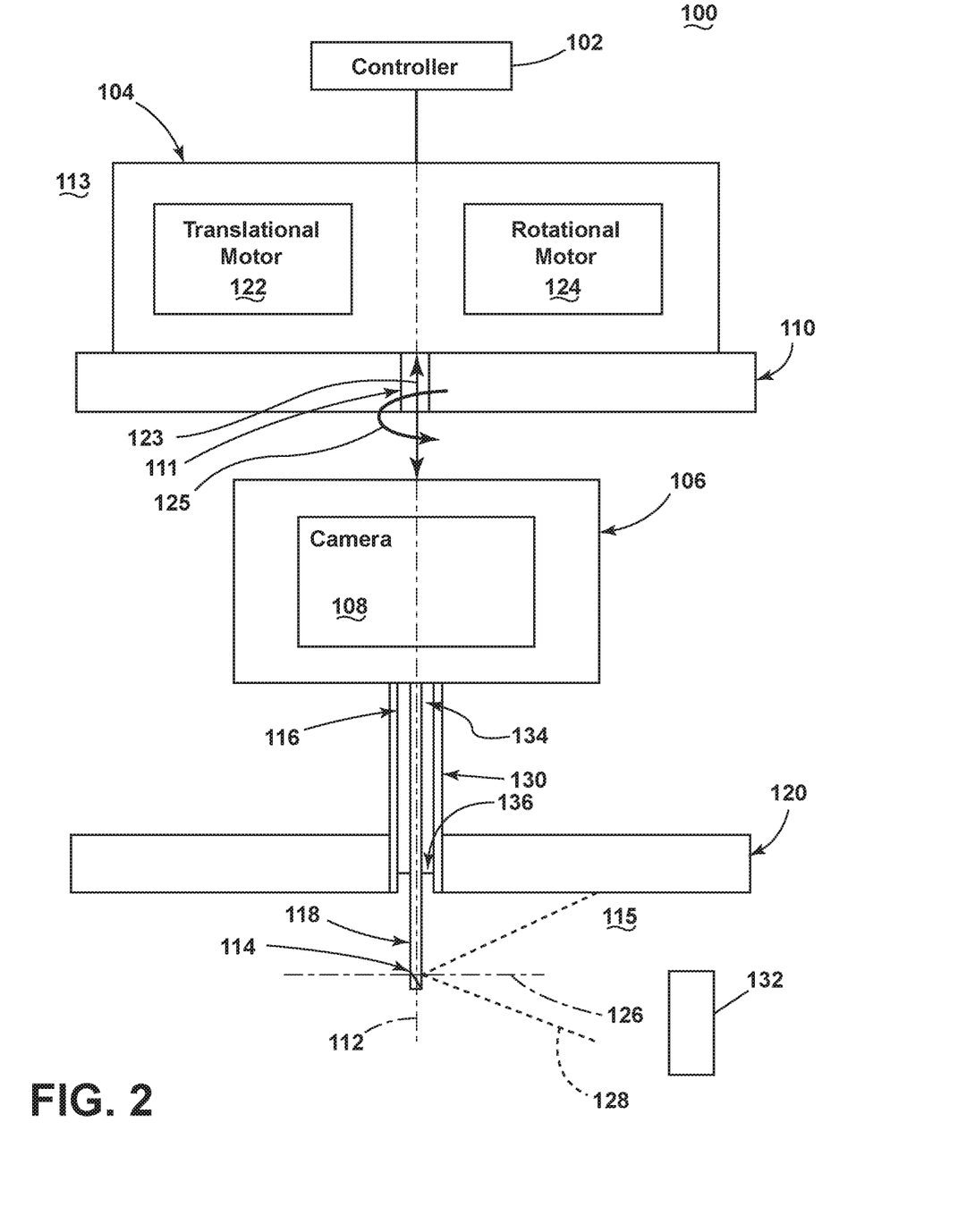
FIG. 2 is a block diagram illustrating an optical imaging system in accordance with various aspects described herein.

FIG. 2 illustrates more clearly that the core casing 46 (shown in FIG. 1) can include a radial wall 110 that defines an exterior 113 and the interior 115 of the gas turbine engine 10. At least one aperture 111 can be formed in a portion of the radial wall 110 and is preferably located in proximity to a set of turbine blades 68, 70 (shown in FIG. 1) located in the interior 115 of the gas turbine engine 10 and that are configured to rotate about a shaft or rotor. The rotor can be any rotary part of the engine including, but not limited to, the HP spool 48 (shown in FIG. 1) and the LP spool (shown in FIG. 1). An optical imaging system 100 is configured to image at least a portion of the interior 115 of the gas turbine engine 10 while the gas turbine engine 10 is operating.

Embodiments of the optical imaging system 100 can include a housing 106, a camera 108 located within the housing 106, a hollow probe 118 or optics tube extending from the housing 106, an image receiving device 114 at the end of the hollow probe 118 and at least one mechanism 104 configured to maneuver the hollow probe 118 within the interior 115 of the gas turbine engine 10. The housing 106 is included and configured for mounting to the radial wall 110 of the turbine engine. The optical imaging system 100 can be manipulated to directionally control the image receiving device 114, including when inside the gas turbine engine 10. More specifically, at least one mechanism 104 can be coupled with the housing 106 and configured to urge the hollow probe 118 to move along or traverse 123 the longitudinal axis 112 through the aperture 111 into the interior 115 of the gas turbine engine. Further, the urging mechanism 104 can be configured to rotate the hollow probe 118 about the longitudinal axis 112 to induce yaw 125. The urging mechanism 104 can include one or more motors useful for rotating and translating a shaft. For example, as shown, the urging mechanism 104 can include both a translational motor 122 and a rotational motor 124. The urging mechanism 104 can be formed from any device useful for urging or maneuvering the hollow probe 118 along the longitudinal axis 112 into a cavity in the interior 115 of the turbine engine including, but not limited to, one or more permanent magnet stepper motors, hybrid synchronous stepper motors, variable reluctance stepper motors, lavet type stepping motors, AC motors, DC motors, gearboxes, etc. and combinations thereof.

Directional control of the image receiving device 114 is provided by a controller 102 external to the gas turbine engine 10. Thus, the image receiving device 114 is directionally controlled such that a selected one or more components internal to the gas turbine engine 10 can be viewed externally of the gas turbine engine 10. Parts of the optical imaging system 100 can be cooled including, but not limited to, by flowing a cooling medium along a substantial portion of the length of the hollow probe 118 and particularly about the image receiving device 114.

The housing 106 can indirectly mounts to the radial wall 110 via a coupling along the longitudinal axis 112 to the urging mechanism 104. That is, the urging mechanism 104 directly mounts to the radial wall 110 at the exterior 113 of the turbine engine and the housing 106 is coupled to the urging mechanism through the aperture 111 via a shaft that can traverse 123 and yaw 125 along the longitudinal axis 112. The housing 106 can be mounted to the radial wall 110 through any known mounting method and can include direct mounting to the radial wall 110 and indirect mounting whereby the housing 106 is coupled to additional components that are mounted to the radial wall 110. The housing 106 can be made of any material suitable for protecting the housed camera 108 from high temperatures and pressures associated with gas turbine engines including, but not limited to, stainless steel, aluminum, titanium, and the like.

Contained within the housing 106, the camera 108 is responsive to imaging data of one or more components of a turbine engine positioned within a field of view 128 of the image receiving device 114. The camera 108 is configured to sense a temperature of a surface in the cavity or interior 115 of the gas turbine engine 10. The camera 108 can be any device for recording image data correlated to surface temperatures including, but not limited to, an infrared camera, a visible camera, a pyrometer, a multi-spectral camera, a hyperspectral camera, a charge-coupled device, an active pixel sensor, a complementary metal-oxide-semiconductor (CMOS) sensor, etc. The camera 108 can also be configured to visually inspect a set of turbine blades of the gas turbine engine 10 including that the camera is configured to visually inspect a set of turbine blades as the set of turbine blades rotate past the image receiving device.

The hollow probe 118, which can also be referred to as a borescope, extends from the housing 106 generally along the longitudinal axis 112 normal to the radial wall 110 towards the interior 115 of the turbine engine 10. The hollow probe 118 provides a conduit of optical communication from the image receiving device 114 at the end of the probe 118 such that the image receiving device 114 is communicably coupled with the camera 108 within the housing 106. The hollow probe 118 can include any components used in the transmission of optical data including, but not limited to, free space, one or more lenses, fiber optic cable and combinations thereof.

The image receiving device 114 located at the distal end of the hollow probe 118 redirects incoming optical data to relay along the longitudinal axis 112. The image receiving device can also relay imagery from a field of view 128 along an axis 126 normal to the longitudinal axis to enable the camera 108 to view an image substantially normal to the longitudinal axis 112. The image receiving device 114 can be configured to relay imagery from any suitable field of view 128 and axis for transmission along the longitudinal axis 112 to the camera 108. The image receiving device 114 can include any optical element known for redirecting or focusing optical imagery including but not limited to a mirror, a fiber optic, lenses, prisms, and combinations thereof.

Concentric to the hollow probe 118, one or more guide tubes 116, 130 can protect and assist to maneuver the hollow probe 118. For example, a moving guide tube 116 can include a first end 134 proximate to the camera 108 or housing 106 and a second end 136 proximate to the shroud 120. The moving guide tube 116 can be configured to traverse and rotate with the camera housing 106 along the longitudinal axis 112. By way of further example, a fixed or stationary guide tube 130 can be fixed to a wall of the turbine engine 10 where the wall can be any interior structure within the turbine engine 10 including, but not limited to, the radial wall 110 that forms the vanes of a turbine stage, or the shroud 120. As shown, the moving guide tube 116 can be located within the interior of the stationary guide tube 130, and can be made to traverse and rotate along the longitudinal axis 112, relative to the stationary guide tube 130.

When the hollow probe 118 or borescope is maneuvered to the correct location, the probe optics enable the camera 108 to image the surface of the shroud 120 or a set of turbine blades 132 relative to the shroud 120. Advantageously, the camera 108 attached to the traversing and yawing urging mechanism 104 and coupled to the hollow probe 118 allows the shroud 120 to be imaged while the gas turbine engine is operating. The hollow probe 118 along with the guide tubes 116, 130 can include multiple tubes with optical elements and passages for cooling and purging of air.

Figure 3:
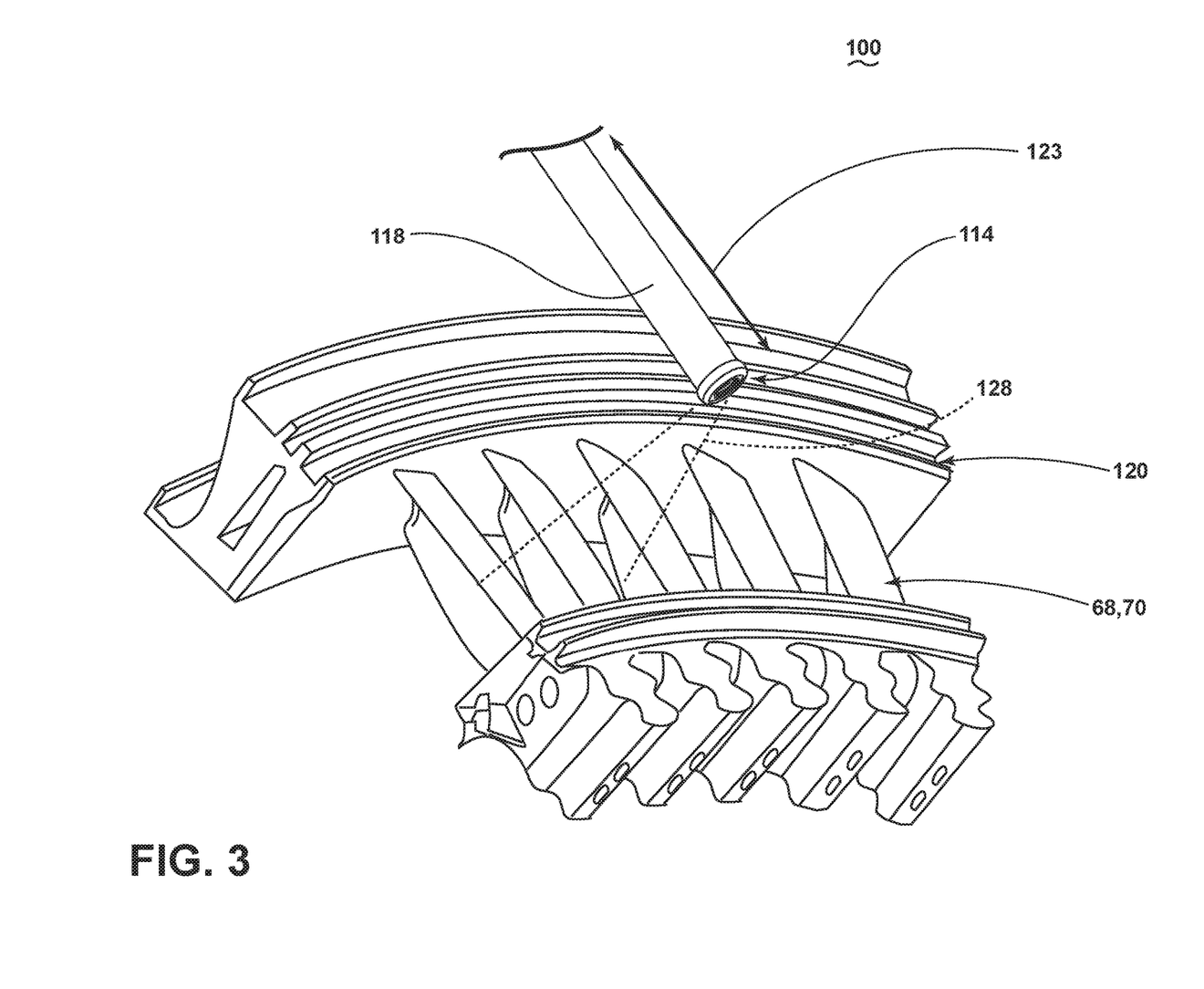
FIG. 3 is a perspective view illustrating an apparatus of an optical imaging system, such as that in FIG. 2, with an optical sight tube in accordance with various aspects described herein.

Referring now to FIG. 3, a perspective view of portions of the optical imaging system 100 is shown. The optical imaging system 100 is configured to traverse 123 into or out of the turbine engine 10 to visually inspect a set of turbine blades 68, 70 or the shroud 120. Due to the system configuration, the optical imaging system 100 can visually inspect a set of turbine blades 68, 70 as they rotate past the image receiving device 114 or the field of view 128, relative to the distal end of the extended hollow probe 118. During the operation of the gas turbine engine 10, the edge of the hot gas path and the radial wall 110 move relative to each other due to thermal growths, pressure and temperature variations. The guide tube 116, 130 assemblies that extends between the two components, which are moving with respect to each other during turbine engine 10 operation, needs to be flexible. However, the optical tube or hollow probe 118 cannot flex as it consists of several optical elements which needs to be aligned in a rigid tube to be able to transmit or relay the image from the image receiving device 114 at the distal end to the opposing end where the image is received by the camera 108.

Figure 4:
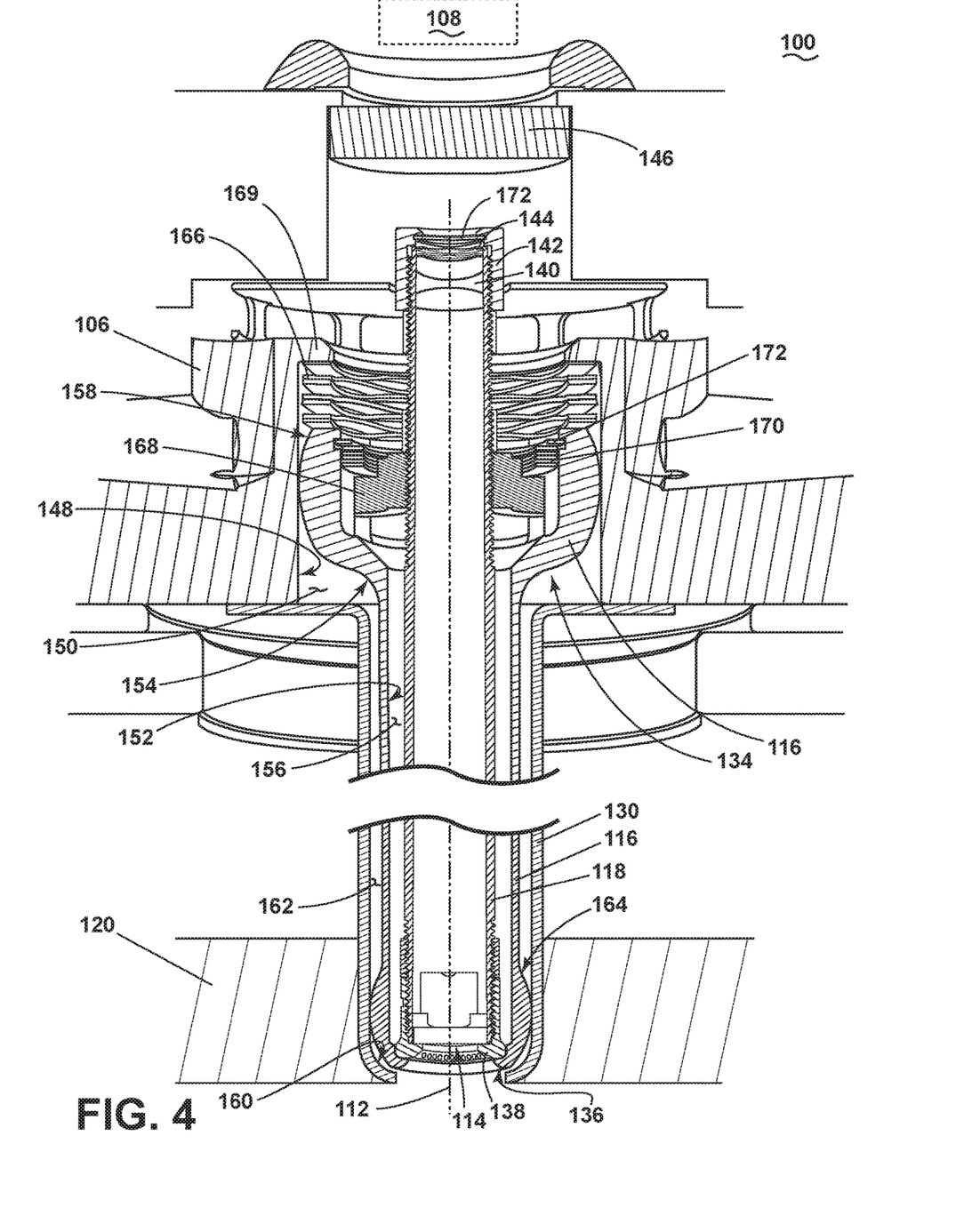
FIG. 4 is a sectional view of portions of the optical imaging system of FIG. 3 in accordance with various aspects described herein.

FIG. 4 is a sectional view of a portion of the optical imaging system 100 and a guide tubes 116, 130 in accordance with embodiments of the disclosure. As shown, the housing 106 includes an inner surface 148 defining a housing interior 150. The moving guide tube 116 is received in the housing interior 150, and includes an inner surface 152 defining a moving guide tube interior 156, and an outer surface 154. The outer surface 154 of the moving guide tube 116 proximate to the first end 134 is shown having a first curved portion or first curved outer surface 158. The first curved outer surface 158 can be sized, shaped, or otherwise have a profile such that it is in contact with the inner surface 148 of the housing 106.

Embodiments of the first curved outer surface 158 can include a spherical, semi-spherical, circular, or arcuate surface, profile, or shape facing the inner surface 148 of the housing 106. The first curved outer surface 158 can be selected or configured such that the pivoting of the moving guide tube 116 substantially at or proximate to the first end 134 allows for at least a range of movement wherein the first curved outer surface 158 remains substantially in contact with the inner surface 148 of the housing 106. In one non-limiting example, the configuration of the first curved outer surface 158 can allow for at least a limited range of movement in any radial direction relative to the longitudinal axis 112. In another non-limiting example, the moving guide tube 116 can pivot substantially at or proximate to the first end 134 up to five degrees from the illustrated resting longitudinal axis 112.

The stationary guide tube 130 can also include an inner surface 160 defining a stationary guide tube interior 162 further receiving at least a portion of the second end 136 of the moving guide tube 116. A second curved portion or second curved outer surface 164 can be included on the moving guide tube 116 proximate to the second end 146, the shroud 120, or to the interior of the turbine engine 10. The second curved outer surface can be sized, shaped, or otherwise have a profile such that the second curved outer surface 164 of the moving guide tube 116 is substantially in contact with the inner surface 160 of the stationary guide tube 130.

Embodiments of the second curved outer surface 164 can likewise include a spherical, semi-spherical, circular, or arcuate surface, profile, or shape facing the inner surface 160 of the stationary guide tube 130. The second curved outer surface 164 can be selected or configured such that the pivoting of the moving guide tube 116 substantially at or proximate to the second end 136 allows for at least a range of movement wherein the second curved outer surface 164 remains substantially in contact with the inner surface 160 of the stationary guide tube 130. For example, the pivoting of the moving guide tube 116 relative to the second end 136 can be related to a corresponding pivoting of the moving guide tube 116 at the first end 134. In one non-limiting example, the configuration of the second curved outer surface 164 can allow for at least a limited range of movement in any radial direction relative to the longitudinal axis 112. In another non-limiting example, the moving guide tube 116 can pivot substantially at or proximate to the second end 136 up to five degrees from the illustrated resting longitudinal axis 112.

While the moving guide tube 116 is described as having a first curved outer surface 158 at the first end 134 and a second curved outer surface 164 at the second end 136, embodiments of the disclosure can be included where only one of the first end 134 or the second end 136 includes a curved surface 158, 164. Additionally, while the second curved outer surface 164 is described as sized, shaped, curved, and the like, relative to the inner surface 160 of the stationary guide tube 130, embodiments of the disclosure can be included wherein the second curved outer surface 164 is arranged or configured relative to another relative component. For example, other relative components can include, but is not limited to the shroud 120, the turbine engine 10, or the like, and may depend at least in part on the relative configuration of the optical imaging system 100.

The interior 150 of the housing 106 can further include a moving guide tube spring 166 positioned along the longitudinal axis 112 between the first end of the moving guide tube 116 and an abutting flange 169 of the housing 106. In this sense, the moving guide tube spring 166 is arranged relative to the housing 106 and the moving guide tube 116 to bias the moving guide tube 116 axially along the longitudinal axis 112 away from the housing 106 or camera 108. The moving guide tube spring 166 or the abutting flange 169 can be concentrically arranged about the longitudinal axis 112. The moving guide tube spring 166 can be configured to provide at least a portion of the axial translation of the moving guide tube 116 relative to the housing 106 along the longitudinal axis 112. Axial translation of the moving guide tube 116 relative to the housing 106 along the longitudinal axis 112 can be caused by factors including, but is not limited to, relative movement of the housing 106, shroud 120, stationary guide tube 130, moving guide tube 116, or hollow probe 118 to each other due to thermal growths, pressure and temperature variations, operation of the gas turbine engine 10, or a combination thereof. The moving guide tube spring 166 can further be selected or configured such that a first portion of the spring 166 can be independently flexed, biased, extended, or compressed, compared with another portion of the spring, such as when the moving guide tube 116 moves or pivots at an angle relative to the resting longitudinal axis 112. In one example configuration, the moving guide tube spring 166 can include, but is not limited to, a wave spring.

As explained herein, the moving guide tube interior 156 can be arranged, sized, shaped, or otherwise configured to receive the hollow probe 118. In this sense, the hollow probe 118 is spaced from the interior surface or inner surface 152 of the moving guide tube 116. The moving guide tube interior 156 can be further utilized to provide a cooling medium along a substantial portion of the length of the hollow probe 118, parallel to the longitudinal axis 112. The cooling medium can further be expelled or exhausted from at least one of the moving guide tube 116 or the hollow probe 118 by way of a first cap 138 positioned on the second end 136 of the hollow probe 118. In another embodiment of the disclosure, at least one of the inner surfaces 160 of the moving guide tube 116, the hollow probe 118, or the first cap 138 can include a set of cooling grooves or cooling ports configured to flow the cooling medium to cool the hollow probe 118 or the image receiving device 114. In another embodiment of the disclosure, the first cap 138 can operably couple the second end 136 of the moving guide tube 116 with the hollow probe 118.

As shown, the hollow probe 118 can be at least partially retained relative to the moving guide tube 116 by a mechanical fastener, such as an optics guide fastener 168. The optics guide fastener 168 can be selectably fixed relative to the hollow probe 118, such as by way of a screw interface. The hollow probe 118 and optics guide fastener 168 can further be at least partially retained relative to the moving guide tube 116 by way of a hollow probe spring 170 that is sized, selected or configured to abut an axial surface of at least one of the hollow probe 118 or optics guide fastener 168. The hollow probe spring 170 can be further selectively fixed relative to the moving guide tube 116, for example, by way of a snap ring 172 sized, selected, or configured to retain the hollow probe spring 170 relative to the first end 134 of the moving guide tube 116. The optics guide fastener 168, the hollow probe spring 170, and the snap ring 172 can be concentrically arranged about the longitudinal axis 112, and configured to provide at least a portion of axial translation of the hollow probe 118 along the longitudinal axis 112. The optics guide fastener 168, the hollow probe spring 170, and the snap ring 172 can further be configured to force the hollow probe 118 toward the second end 136. In one non-limiting example embodiment of the disclosure, the hollow probe spring 170 can include, but is not limited to, a wave spring. Axial translation of the hollow probe 118 along the longitudinal axis 112 can be caused by factors including, but is not limited to, relative movement of the housing 106, shroud 120, stationary guide tube 130, moving guide tube 116, or hollow probe 118 to each other due to thermal growths, pressure and temperature variations, operation of the gas turbine engine 10, or a combination thereof.

Also shown, the end of the hollow probe 118, opposite of the cap 138, can include an optical element 140 at least partially retained relative to the hollow probe by a mechanical fastener, including but not limited to a second cap 142. The optical element 140 can include any optical element known for redirecting or focusing optical imagery including but not limited to a mirror, a fiber optic, lenses, prisms, and combinations thereof. The second cap 142 can be selectably fixed relative to the hollow probe 118, such as by way of a screw interface. The optical element 140 can be at least partially retained relative to the moving guide tube hollow probe 118 by way of an optics spring 144 that is sized, selected or configured to abut an axial surface of at least one of the hollow probe 118 or optical element 140. The optics spring 144 can be further selectively fixed relative to the hollow probe 118, for example, by way of a snap ring 172 sized, selected, or configured to retain the optics spring 144 relative to the hollow probe 118, or fixed to force the optical element 140 toward the second end 136.

The optics spring 144, the optical element 140, and the snap ring 172 can be concentrically arranged about the longitudinal axis 112, and configured to provide at least a portion of axial translation of the optical element 140 along the longitudinal axis 112. In one non-limiting example embodiment of the disclosure, the optics spring 144 can include, but is not limited to, a wave spring. Axial translation of the optical element 140 along the longitudinal axis 112, or relative to the hollow probe 118, can be caused by factors including, but is not limited to, relative movement of the housing 106, shroud 120, optical element 140, or the hollow probe 118 to each other due to thermal growths, pressure and temperature variations, operation of the gas turbine engine 10, or a combination thereof In another non-limiting embodiment of the disclosure, the optical element 140 can be mounted with the hollow probe 118 such that no light traversing the hollow probe 118 is clipped or cut by the optical element 140, the snap ring 172, or the spring 144, en route to the camera 108. In another non-limiting embodiment of the disclosure, light traversing the hollow probe 118 can further traverse through the optical element 140, and through a window 146, en route to the camera 108. In this sense, the window 146 can be configured to seal a portion of the optical imaging system 100 from proximate environmental conditions, or environmental condition differences, such as the pressurized environment of the engine 10 relative to the optical imaging system 100.

Figure 5:
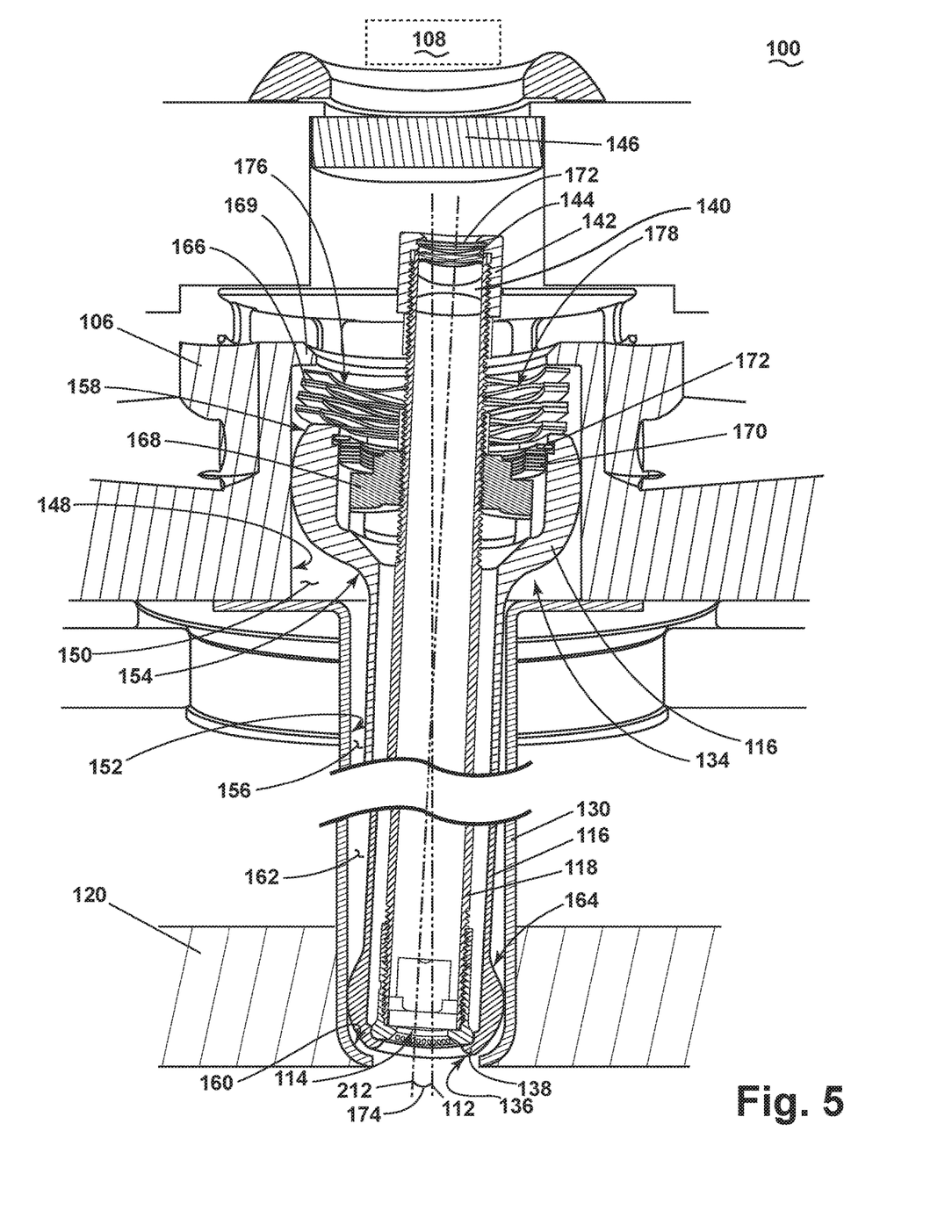
FIG. 5 is a sectional view illustrating movement of the guide tube of FIG. 4 in accordance with various aspects described herein.

FIG. 5 illustrates a sectional view of a portion of the optical imaging system 100 illustrated in FIG. 4, wherein the moving guide tube 116 is pivoted at the first and second ends 134, 136. As shown, the first and second curved outer surfaces 158, 164 remain in contact with the respective inner surfaces 148, 160 of the housing 106 and stationary guide tube 130. Also shown is a second longitudinal axis 212 of the pivoted moving guide tube 116, relative to the resting longitudinal axis 112 of FIG. 4. It is understood that the relative pivot angle of the moving guide tube 116 is exaggerated for illustrative and understanding purposes, and non-limiting embodiments of the disclosure can include a relative pivot angle 174 of five degrees or less. The illustrated example also demonstrates how the moving guide tube spring 166 can further be selected or configured such that a first portion 176 of the spring 166 can be independently flexed, biased, extended, or compressed, compared with another portion 178 of the spring, such as when the moving guide tube 116 moves or pivots at an angle relative to the resting longitudinal axis 112.

As used herein, the terms "axial" or "axially" refer to a dimension along a longitudinal axis 112, 212 of the optical imaging system 100. Also as used herein, the terms "radial" or "radially" refer to a dimension extending between a center longitudinal axis 112, 212 of the optical imaging system 100, an outer circumference, or a circular or annular component disposed relative to the optical imaging system 100.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Many other possible embodiments and configurations in addition to that shown in the above figures are contemplated by the present disclosure. For example, embodiments of the disclosure can be included wherein the first or second ends of the moving guide tube, or the first and second curved outer surfaces are configured or selected to accommodate the space or volume required for a set of estimated relative movements of the hollow probe or the moving guide tube. The set of estimated relative movements of the hollow probe or moving guide tube can further be determined, calculated, estimated, or based on mission and scope of the operating environment. For instance, the amount of vibrations of an aircraft turbine engine will be greater, and thus, include a greater estimation of relative movements, compared with a terrestrial-based turbine engine power generation application. Additionally, additional springs can be used at one or more ends of the moving guide tube or hollow probe to keep the hollow probe from randomly moving, or to keep it pushed to one preferred end. For example, the spring or set of springs can be selected based on individual sizes or combined bias to account or accommodate the expected axial movement of the moving guide tube or the hollow probe, or the determined, expected, or estimated amount of force or bias required to keep the moving guide tube or hollow probe at the preferred end. In another non-limiting embodiment, the set of springs can be selected to ensure that all optical components of the optical imaging system are biased toward the second end, away from the first end. In yet another non-limited embodiment, the set of springs can be selected to ensure that all optical components of the optical imaging system remain in consistent contact with a physical component toward the second end, or remain in consistent contact with a physical component away from the first end. In yet another embodiment of the disclosure, fiber optical components can be utilized in place of, or in addition to, the aforementioned optical components.

Thus, embodiments of the disclosure can be included wherein curved outer surfaces 158, 164 of the moving guide tube 116 can be configured to allow for axial, angular, rocking, or pivotable movement relative to the first or second ends 134, 136. In this sense, a rigid moving guide tube 116 or a rigid hollow probe 118 can be included in the optical imaging system 100, and wherein the optical imaging system 100 allows for relative movement due to, for example thermal growths, pressure and temperature variations, operation of the gas turbine engine 10, or a combination thereof, without flexing or bending the rigid components.

Benefits of the above-described embodiments include capturing two-dimensional data related to temperatures of a shroud that are located above a set rotating turbine blades in an operating gas turbine. The shrouds are located in a very high temperature and pressure environment and are proximate to rotating blades moving at very high velocity. The optical imaging system provides temperature measurements that are necessary to validate analytical designs and models needed to estimate life of these components. Curved surfaces of the optical imaging system provide the capability to pivot about attachment locations and still stay rigid and straight. A set of springs can be used at one or both ends to keep the probe or guide tube from randomly moving and keep them pushed to a preferred end.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optical imaging system, comprising:
   a housing configured for mounting to a wall of a turbine engine;
   a hollow probe extending from the housing and having a longitudinal axis;
   an image receiving device at an end of the hollow probe;
   a rigid guide tube having a first end and a second end and defining an interior receiving at least a portion of the hollow probe wherein at least one of the first end or the second end include curved portions; and
   a spring positioned between the guide tube and the housing arranged to bias the guide tube axially along the longitudinal axis away from the housing and allow a rocking movement of the guide tube.

2. The optical imaging system of claim 1 wherein both the first end and the second end include curved portions such that the guide tube can pivot at those curved portions.

3. The optical imaging system of claim 1 further comprising a camera communicably coupled with image receiving device.

4. The optical imaging system of claim 3 wherein the camera is at least one of a pyrometer camera or an infrared camera.

5. The optical imaging system of claim 3 wherein the camera is configured to sense a temperature of a surface in an interior of the turbine engine.

6. The optical imaging system of claim 3 wherein the camera is configured to visually inspect a set of turbine blades.

7. The optical imaging system of claim 6 wherein the camera is configured to visually inspect a set of turbine blades as the set of turbine blades rotate past the image receiving device.

8. The optical imaging system of claim 6 wherein the image receiving device is configured to enable the camera to view an image substantially normal to the longitudinal axis.

9. The optical imaging system of claim 1 wherein the hollow probe is spaced from an interior surface defining the interior of the guide tube.

10. The optical imaging system of claim 1, further comprising a cap operably coupling an end of the hollow probe to the second end of the guide tube.

11. The optical imaging system of claim 1 wherein at least one of the hollow probe or the guide tube comprises a set of cooling grooves configured to flow a cooling medium to cool the hollow probe.

12. The optical imaging system of claim 1 wherein the image receiving device includes at least one of a lens, mirror, or prism.

13. The optical imaging system of claim 1 wherein the spring comprises multiple springs.

14. The optical imaging system of claim 1, further comprising an optical element at an end of the hollow probe, opposite the image receiving device.

15. The optical imaging system of claim 14 wherein the spring includes an optics spring configured to force the optical element toward the second end.

16. The optical imaging system of claim 14 wherein the optics spring is configured to allow at least a portion of movement of the optical element relative to the hollow probe.

17. The optical imaging system of claim 1 wherein the spring includes a hollow probe spring configured to at least partially retain the hollow probe relative to the guide tube.

18. The optical imaging system of claim 17 wherein hollow probe spring is configured to force the hollow probe toward the second end.

19. The optical imaging system of claim 17 wherein the hollow probe spring is configured to allow at least a portion of movement of the hollow probe relative to the guide tube.

20. A gas turbine engine, comprising:
    a radial wall defining an interior and an exterior of the gas turbine engine and having an aperture;
    a set of turbine blades located in the interior and configured to rotate about a shaft; and
    an optical imaging system, comprising:
      a housing configured for mounting to the radial wall;
      a hollow probe extending from the housing and having a longitudinal axis;
      an image receiving device at an end of the hollow probe where the image receiving device is located adjacent a hot gas path within the interior;
      a rigid guide tube having a first end and a second end and defining an interior receiving at least a portion of the hollow probe wherein at least one of the first end or the second end include curved portions configured to allow for a rocking movement of the guide tube at the curved portions; and
      a spring between the guide tube and the housing adjacent the first end of the guide tube, to bias the guide tube away from the housing towards the second end and allow for axial and rocking movement of the guide tube.

21. The gas turbine engine of claim 20 wherein the optical imaging system is configured to image at least a portion of the interior of the gas turbine engine while the gas turbine engine is operating.

22. The gas turbine engine of claim 20 wherein the at least a portion of the first end comprises a spherical portion.

23. A guide tube assembly, comprising a rigid hollow guide tube having a first end, a second end configured to be housed adjacent a portion of a gas turbine, and an interior surface defining an interior and wherein at least a portion of the second end includes a curved surface allowing it to rock against the portion of the gas turbine; and
    a spring adjacent the first end of the guide tube and arranged to bias the guide tube towards the second end and allow a rocking movement of the guide tube.

24. The guide tube assembly of claim 23 wherein the at least a portion of the second end comprises a spherical portion.

* * * * *